(12) United States Patent
Kawazoe et al.

(10) Patent No.: US 6,206,617 B1
(45) Date of Patent: Mar. 27, 2001

(54) REAMER WITH GUIDE SURFACE AND METHOD OF FINISHING HOLE BY USING THE SAME

(75) Inventors: Tetsuhiro Kawazoe; Mitsuhiko Tomioka; Tetsuro Nakanose; Motoshi Nakamura; Hiroyasu Sakai; Toshihiro Yasuda, all of Toyota (JP)

(73) Assignee: Fuji Seiko Limited, Toyota (JP)

( * ) Notice: Subject to any disclaimer, the term of this patent is extended or adjusted under 35 U.S.C. 154(b) by 0 days.

(21) Appl. No.: 09/410,047

(22) Filed: Oct. 1, 1999

(30) Foreign Application Priority Data

Feb. 9, 1998 (JP) .................................................. 10-350320

(51) Int. Cl.⁷ .............................. B23B 51/00; B23B 35/00

(52) U.S. Cl. .............................. 408/57; 408/1 R; 408/83; 408/144; 408/145; 408/199; 408/227

(58) Field of Search ................................. 408/1 R, 57, 59, 408/81, 83, 144, 145, 199, 227, 229, 226

(56) References Cited

U.S. PATENT DOCUMENTS

| | | | | |
|---|---|---|---|---|
| 1,323,276 | * | 12/1919 | Hoagland | 408/57 |
| 5,125,772 | * | 6/1992 | Kress | 408/199 |
| 5,238,335 | * | 8/1993 | Nomura | 408/199 |
| 5,967,707 | * | 10/1999 | Larson | 408/229 |

FOREIGN PATENT DOCUMENTS

2237743 * 2/1974 (DE) ..................................... 408/229

* cited by examiner

*Primary Examiner*—Daniel W. Howell
(74) *Attorney, Agent, or Firm*—Oliff & Berridge, PLC

(57) ABSTRACT

A reamer including; a generally cylindrical cutter body having (a) a flute formed in an outer circumferential surface of the cutter body and extending from an axially distal end of the cutter body toward an axially proximal end of the cutter body, (b) a cutting blade portion positioned at a longitudinally distal end of a downstream one of widthwise opposite edges of the flute as viewed in a rotating direction of the reamer, and (c) a guide portion having a guide surface which is circumferentially adjacent to the flute and which circumferentially extends over at least 240° about an axis of the cutter body. The guide surface is a part of the outer circumferential surface of the cutter body.

17 Claims, 4 Drawing Sheets

FIG. 4(a)

(UNIT: μm)

|    | 1    | 2   | 3    | 4   | 5   | 6    | 7   | 8    |
|----|------|-----|------|-----|-----|------|-----|------|
| IN | 11.8 | 7.9 | 8.6  | 9.8 | 4.2 | 10.7 | 6.3 | 11.1 |
| EX | 11.3 | 4.8 | 10.3 | 9.4 | 5.7 | 10.2 | 3.9 | 12.9 |

FIG. 4(b)

(UNIT: μm)

|    | 1   | 2   | 3   | 4   | 5   | 6   | 7   | 8   |
|----|-----|-----|-----|-----|-----|-----|-----|-----|
| IN | 1.3 | 2.1 | 1.2 | 2.1 | 1.2 | 1.9 | 1.5 | 2.6 |
| EX | 2.4 | 2.0 | 2.4 | 2.0 | 1.6 | 2.0 | 3.0 | 1.9 |

IN: INTAKE VALVE GUIDE
EX: EXHAUST VALVE GUIDE

FIG. 5

|  |  | REAMER A | | REAMER B | | REAMER C | |
|---|---|---|---|---|---|---|---|
|  |  | 1ST | 2ND | 1ST | 2ND | 1ST | 2ND |
| ROUNDNESS (μm) | IN #1 | 1.9 | 1.9 | 2.1 | 2.2 | 2.3 | 2.5 |
|  | #3 | 2.4 | 1.9 | 2.4 | 2.2 | 2.7 | 2.4 |
|  | #5 | 2.4 | 1.9 | 2.7 | 2.9 | 2.2 | 3.0 |
|  | #7 | 1.7 | 2.4 | 1.9 | 2.4 | 2.6 | 2.6 |
|  | EX #2 | 2.9 | 2.9 | 3.8 | 4.0 | 4.1 | 3.8 |
|  | #4 | 2.4 | 2.1 | 2.9 | 2.9 | 3.0 | 2.8 |
|  | #6 | 2.3 | 1.8 | 3.0 | 2.8 | 3.2 | 2.5 |
|  | #8 | 2.4 | 2.4 | 2.8 | 3.2 | 3.3 | 3.1 |
| SURFACE ROUGHNESS (z) | | 1.2 | 0.6 | 0.6 | 0.9 | 1.0 | 2.4 |

IN: INTAKE VALVE GUIDE
EX: EXHAUST VALVE GUIDE

REAMER WITH GUIDE SURFACE AND METHOD OF FINISHING HOLE BY USING THE SAME

The present application is based on Japanese Patent Application No. 10-350320 filed Dec. 9, 1998, the content of which is incorporated hereinto by reference.

BACKGROUND OF THE INVENTION

1. Field of the Invention

The present invention relates in general to a reamer, and a method of finishing a hole prepared in a workpiece made of aluminum or other material by using the reamer.

2. Discussion of the Related Art

In the art of finishing a hole prepared in a workpiece made of aluminum or other material with a high degree of roundness of the finished hole and a high degree of smoothness of the inner circumferential surface of the finished hole, a two-blade or a four-blade reamer has been employed. The two-blade reamer has two blades diametrically opposed to each other, and two guide pads each circumferentially spaced apart from the two blades by 90°. The four-blade reamer has four blades which are equiangularly spaced apart from each other by 90° in its circumferential direction. Further, for finishing a hole in a gun barrel or other deep hole, a single-blade reamer (gun reamer) has been conventionally used. However, these conventional reamers are not capable of assuredly satisfying severe reaming requirements, i.e., finishing the hole with a high degree of roundness and a high degree of surface smoothness, for example, a roundness of 7 $\mu$m or less and a surface roughness of 6z or less (6 $\mu$m or less in ten point height of irregularities (Rz)).

SUMMARY OF THE INVENTION

It is therefore a first object of the present invention to provide a reamer which is capable of finishing a hole prepared in a workpiece made of an aluminum or other material, with a high degree of roundness and a high degree of surface smoothness.

It is a second object of the invention to provide a method of finishing such a hole with a high degree of roundness and a high degree of surface smoothness, by using the reamer constructed according to the invention.

The above first object may be achieved according to any one of the following modes of the present invention, which are numbered and dependent from each other, like the appended claims, to indicate possible combinations of elements or features in preferred forms of the present invention.

(1) A reamer including;

a generally cylindrical cutter body having (a) a flute formed in an outer circumferential surface of the cutter body and extending from an axially distal end of the cutter body toward an axially proximal end of the cutter body, (b) a cutting blade portion positioned at a longitudinally distal end of a downstream one of widthwise opposite edges of the flute as viewed in a rotating direction of the reamer, and (c) a guide portion having a guide surface which is circumferentially adjacent to the flute and which circumferentially extends over at least 240° about an axis of the cutter body, the guide surface being a part of the outer circumferential surface of the cutter body.

The reamer constructed according to the present mode of the invention has the guide surface circumferentially extending over at least 240° about the axis of the cutter body. The cutting blade portion is positioned at the longitudinally distal end of the downstream one of widthwise opposite edges of the flute, namely, at the longitudinally distal end of the downstream one of the opposite edges which circumferentially define the flute. When this reamer is used to finish a hole prepared in a workpiece, the inner circumferential surface of the hole is cut with the cutter body of the reamer being guided at the guide surface by the inner circumferential surface of the hole. Thus, the reamer is held, over at least 240°, i.e., at least two-thirds of its periphery, by the inner circumferential surface of the hole, whereby the reamer is prevented from being radially displaced relative to the axis of the hole during the cutting operation, resulting in improved roundness and cylindricity of the hole. It is preferable that the guide surface circumferentially extend over at least 255°. It is more preferable that the guide surface circumferentially extend over at least 270°. The flute may extend in parallel with the axis, or alternatively may extend in a helical direction of the cutter body. It is noted that the present reamer is suitable, particularly, for finishing the hole prepared in an aluminum workpiece, although the reamer may be used for any other purpose.

(2) A reamer according to mode (1), wherein a radial distance from the axis to the guide surface is constant over a circumferential length of the guide surface.

(3) A reamer according to mode (1) or (2), wherein at least a portion of the generally cylindrical cutter body which is other than the cutting blade portion is made of the same material.

(4) A reamer according to mode (3), wherein the same material is a cemented carbide.

(5) A reamer according to any one of modes (1)–(4), wherein the cutting blade portion is coated with a ultra-high temperature and ultra-high pressure sintered compact.

In the reamer constructed according to this mode (5), the ultra-high temperature and ultra-high pressure sintered compact may be a sintered compact which is formed by sintering a diamond powder (for example, a mixture of natural diamond and artificial diamond), or a CBN sintered compact which is formed of a cubic boron nitride at a ultra-high temperature and under a ultra-high pressure.

(6) A reamer according to any one of modes (1)–(5), wherein the generally cylindrical cutter body further has a fluid passage formed therethrough, and a fluid supply spout communicating with the fluid passage and open in a flank face which is circumferentially contiguous to and positioned on a downstream side of the flute as viewed in the rotating direction, so that a fluid flowing through the fluid passage is delivered through the fluid supply spout to the flank face.

During the cutting operation, some cutting chips are likely to be moved toward the downstream side of the flute. If such cutting chips are drawn into a radial gap or clearance between the guide surface and the inner circumferential surface of the hole being cut, the inner circumferential surface of the hole is possibly scratched by the cutting chips, and also the cutting chips may stick to the guide surface, deteriorating the surface smoothness and the dimensional accuracy of the guide surface. According to the reamer of the present mode (6), the fluid spouts out of the fluid supply spout open in the flank face, so as to wash away or clean up the cutting chips from the downstream side of the flute, thereby preventing the cutting chips from entering the radial gap between the guide surface and the inner circumferential surface of the hole. Thus, the present reamer assures a further improved roundness of the hole and a further improved surface smoothness of its inner circumferential surface. It is possible to use a coolant liquid, a pressurized air (air blast) or any other suitable kind of fluid as the above-described fluid to be supplied to the fluid passage. Where the coolant fluid is used, the fluid can also serves to lubricate and cool the guide surface and the inner circumferential surface of the hole. It is more preferable to form another fluid supply spout in the flute.

(7) A reamer according to any one of modes (1)–(5), wherein the generally cylindrical cutter body has a second flute in addition to the flute as a first flute, the second flute being formed in the outer circumferential surface, extending from the axially distal end of the cutter body toward the axially proximal end of the cutter body, and circumferentially contiguous to and positioned on a downstream side of the first flute as viewed in the rotating direction, so that a lateral surface defined by widthwise opposite edges of the second flute is generally concaved toward the axis as viewed in a transverse cross section of the cutter body, and wherein a portion of the lateral surface which is circumferentially remotest from the first flute intersects with the outer circumferential surface of the cutter body at substantially right angles.

A portion of the above-described lateral surface, which is circumferentially contiguous to the first flute, has to be inclined with respect to a line or plane which is tangent, at a radially outer end of the cutting blade portion, to an imaginary cylindrical surface which is conceptually defined by the rotary trajectory of the radially outer end of the cutting blade portion, so as to intersect with the tangential line at a predetermined relief angle. Where the radial distance from the axis to the radially outer end of the cutting blade portion is gradually reduced in the axial direction as recited in the below-described mode (13), the above-described imaginary cylindrical surface is replaced by a conical or tapered surface. However, even in such a case, the imaginary conical surface can be still considered as a cylindrical surface, since the rate of reduction of the radial distance in relation to the axial distance is extremely small If the portion of the lateral surface which is circumferentially remotest from the first flute has substantially the same angle as the above-described relief angle with respect to the tangential plane, this portion intersects with the guide surface at an angle almost equal to 180°. In this case, the intersection does not provide an acute edge, resulting in formation of an acute-wedge-shaped spacing or gap between the lateral surface and the inner circumferential surface of the hole. Some cutting chips, which have been moved toward the downstream side of the first flute, i.e., into the wedge-shaped gap space, are likely to be drawn into the spacing between the guide surface and the inner circumferential surface of the hole, by a wedge effect, possibly causing scratches on the inner circumferential surface of the hole and also deteriorating the surface smoothness and the dimensional accuracy of the guide surface due to the cutting chips sticking to the guide surface.

According to the reamer of the mode (7), the portion of the lateral surface which is circumferentially remotest from the first flute intersects with the outer circumferential surface at the substantially right angles, thereby serving as a scraper for removing the cutting chips off the inner circumferential surface of the hole. Thus, even in a case where the cutting chips are moved toward the downstream side of the first flute, i.e., into the second flute, the cutting chips are advantageously prevented from entering the radial gap between the guide surface and the inner circumferential surface of the hole, avoiding the scratches on the inner circumferential surface of the hole and the sticking of the cutting chips to the guide surface, and accordingly assuring a further improved roundness of the hole and a further improved surface smoothness of the inner circumferential surface of the hole.

(8) A reamer according to any one of modes (1)–(5), wherein the generally cylindrical cutter body has a second flute in addition to the flute as a first flute, the second flute being formed in the outer circumferential surface so as to extend from the axially distal end of the cutter body toward the axially proximal end of the cutter body and so as to be circumferentially contiguous to and positioned on a downstream side of the first flute as viewed in the rotating direction, so that a lateral surface defined by widthwise opposite edges of the second flute is generally concaved toward the axis as viewed in a transverse cross section of the cutter body, and wherein the cutting blade portion has an axially extending cutting edge at a radially outer end thereof, the lateral surface having at least two flat faces which are circumferentially contiguous to each other, one of the at least two flat faces being circumferentially contiguous to the first flute and serving as a flank face of the axially extending cutting edge, one of the at least two flat faces being circumferentially remotest from the first flute and intersecting with the outer circumferential surface of the cutter body at substantially right angles.

In the reamer of this mode (8), the above-described one of the at least two flat faces which is circumferentially contiguous to the first flute serves as the flank face which intersects with a rake face to form the axially extending cutting edge, while the above-described one of the at least two flat faces which is circumferentially remotest from the first flute intersects with the outer circumferential surface of the cutter body at the substantially right angles so as to serve as a scraper for removing the cutting chips off the inner circumferential surface of the hole.

(9) A reamer according to mode (7) or (8), wherein the generally cylindrical cutter body further has a fluid passage formed therethrough and a fluid supply spout communicating with the fluid passage and open in the lateral surface, so that a fluid flowing through the fluid passage is delivered through the fluid supply spout into the second flute.

The fluid supplied into the second flute through the fluid supply spout serves to wash away or clean up the cutting chips from the second flute, thereby preventing the chips from entering the radial gap between the guide surface and the inner circumferential surface of the hole, and also serves to lubricate and cool the guide surface and the inner circumferential surface of the hole.

(10) A reamer according to any one of modes (1)–(9), wherein the cutting blade portion projects outwardly from the outer circumferential surface in a radial direction of the generally cylindrical cutter body, so that a radial distance from the axis to a radially outer end of the cutting blade portion is larger than a radial distance from the axis to the guide surface, by a predetermined amount ranging from 3 $\mu$m to 20 $\mu$m.

The radial distance from the axis to the guide surface has to be smaller than the radial distance from the axis to the radially outer end of the cutting blade portion, by a suitable amount of difference. If this amount is too small, the guide surface is excessively burnished by the inner circumferential surface of the hole, causing a considerably large amount of heat generation therebetween due to the large area of the guide surface, and a consequent material fusion on the guide surface. If the amount of difference is too large, on the other hand, the cutting chips are likely to enter the radial gap between the guide surface and the inner circumferential surface of the hole, whereby the cutting chips possibly stick to the guide surface, deteriorating the surface smoothness of the inner circumferential surface of the hole. Further, in the latter case, the cutter body cannot be suitably guided by the inner circumferential surface of the hole.

In general, the above-described amount of difference of the radial distance ranges preferably from 3 μm to 20 μm, and more preferably from 3 μm to 12 μm. Further, the amount of difference may range from 3 μm to 7 μm, or 8 μm to 12 μm, depending upon the purpose or condition of the cutting operation.

(11) A reamer according to any one of modes (1)–(9), wherein the cutting blade portion projects outwardly from the outer circumferential surface in a radial direction of the generally cylindrical cutter body, so that a radial distance from the axis to a radially outer end of the cutting blade portion is larger than a radial distance from the axis to the guide surface by a predetermined amount, a ratio of said predetermined amount to the radial distance from the axis to the guide surface ranging from 0.0002 to 0.0013.

(12) A reamer according to any one of modes (1)–(11), wherein the generally cylindrical cutter body further has a cutout formed in the outer circumferential surface, such that the cutout is axially offset from said cutting blade portion toward the axially proximal end of the cutter body, and such that the cutout is substantially diametrically opposed to the flute, so that the cutout cooperates with the flute to maintain a dynamic balance of the reamer while the reamer is rotated.

In the reamer constructed according to mode (12), the cutout is provided in the outer circumferential surface of the cutter body so as to be substantially diametrically opposed to the flute. The provision of the cutout in the cutter body is effective to maintain the dynamic balance of the reamer, preventing a run-out of the cutter body even where the reamer is rotated at a high velocity. Thus, it is possible to further accurately and efficiently finish the hole, with the reamer being rotated at the high velocity. If the cutout is located at the same axial position as the cutting blade portion, the dynamic balance of the reamer would be further assuredly maintained. However, in this case, the circumferential length of the guide surface in the axially distal end portion is reduced. Thus, for maximizing the circumferential length of the guide surface in the axially distal end portion, it is desirable that the cutout be formed to be axially offset from the cutting blade portion toward the axially proximal end of the cutter body.

(13) A reamer according to any one of modes (1)–(12), wherein the generally cylindrical cutter body is slightly tapered such that a radial distance from the axis to the guide surface is progressively reduced in a direction away from the axially distal end of the cutter body toward the axially proximal end of the cutter body.

(14) A reamer according to any one of modes (1)–(13), wherein a radial distance from the axis to a radially outer end of the cutting blade portion is progressively reduced in a direction away from the axially distal end of the cutter body toward the axially proximal end of the cutter body.

(15) A reamer according to any one of modes (1)–(14), wherein the cutting blade portion is constituted by a cutting insert or tip which is formed independently of the other portion of the generally cylindrical cutter body and which is fixed to the other portion of the cutter body, the cutting insert including a ultra-high temperature and ultra-high pressure sintered compact and a cemented carbide substrate which is coated with the sintered compact.

It is possible to apply the coating to the longitudinally distal end of the downstream edge of the flute, so that the cutting blade portion is covered by the coating. However, the cutting blade portion may be constituted by the cutting insert or tip which is formed independently of the other portion and which is fixed to the cutter body, as recited in the present mode (15). In the latter case, it is easier to form the sintered compact (coating), thereby advantageously reducing the cost of manufacture of the reamer.

(16) A reamer according to any one of modes (1)–(15), further comprising a generally cylindrical shank having a diameter smaller than that of the generally cylindrical cutter body, wherein the cutter body and the shank are fixed to each other so as to provide a single assembly.

The above-described second object may be achieved according to any one of the following modes of the present invention.

(17) A method of finishing an inner circumferential surface of a hole prepared in a workpiece, by using the reamer recited in mode (1), the method including:

a step of moving the reamer and the workpiece relative to each other in an axial direction of the reamer while rotating the reamer and the workpiece relative to each other, so that the inner circumferential surface is cut by the cutting blade portion, with the generally cylindrical cutter body being guided by the inner circumferential surface of the hole, at the guide surface which circumferentially extends over at least 240° about the axis.

(18) A method according to mode (17), wherein the generally cylindrical cutter body further has a fluid passage formed therethrough, and a fluid supply spout communicating with the fluid passage and open in a flank face which is circumferentially contiguous to and positioned on a downstream side of the flute as viewed in the rotating direction, the method further including:

a step of supplying a fluid to the fluid passage so that the fluid is delivered through the fluid supply spout to the flank face, whereby cutting chips moved toward the downstream side are prevented from entering a radial gap between the guide surface and the inner circumferential surface of the hole.

BRIEF DESCRIPTION OF THE DRAWINGS

The above and optional objects, features, advantages and technical and industrial significance of the present invention will be better understood by reading the following detailed description of a presently preferred embodiment of the invention, when considered in connection with the accompanying drawings, in which:

FIG. 4(a) is a table showing a roundness value of each hole whose inner circumferential surface was finished by a conventional reamer;

FIG. 4(b) is a table showing a roundness value of each hole whose inner circumferential surface was finished by a reamer constructed according to the invention; and FIG. 5 is a table showing roundness and surface roughness values of the inner circumferential surface of holes which were finished by three reamers of the present invention which were different from each other in an amount of radius difference between the radial distance from the axis to the axially extending cutting edge and the radial distance from the axis to the guide surface.

DETAILED DESCRIPTION OF THE PREFERRED EMBODIMENT

Figure 1:
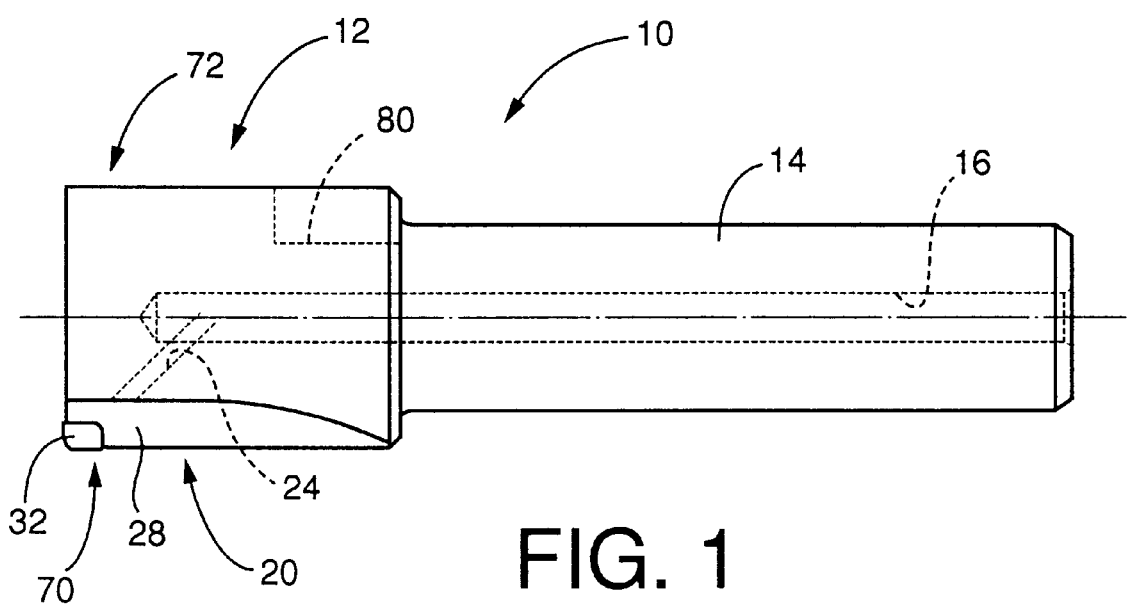
FIG. 1 is a front elevational view of a reamer according to one embodiment of this invention.
Figure 2:
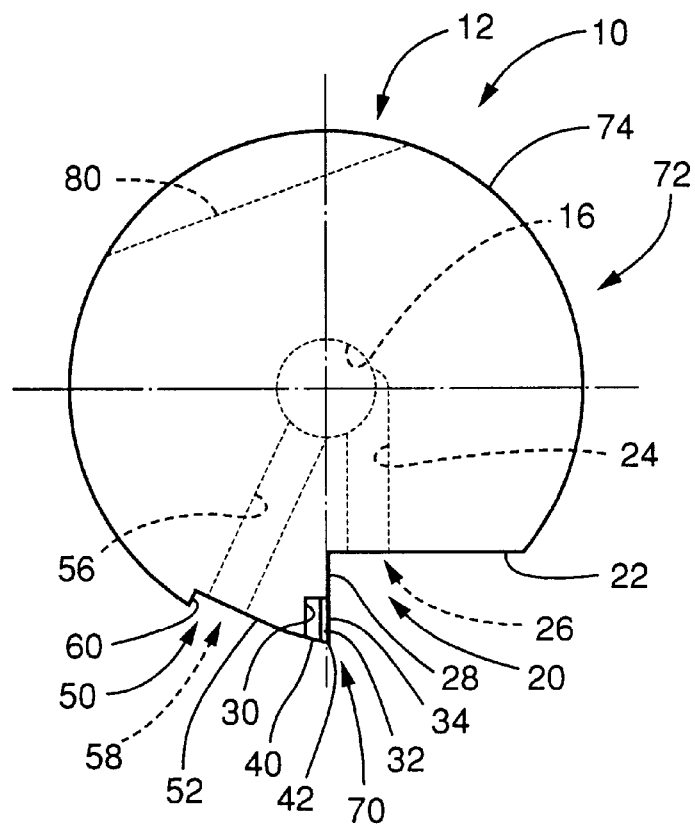
FIG. 2 is a left side elevational view of the reamer of FIG. 1.
Figure 3:
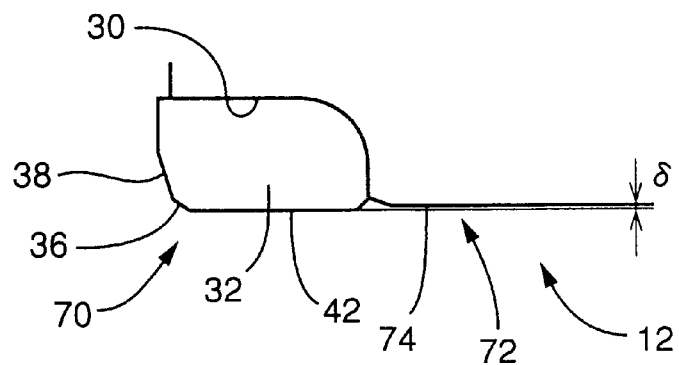
FIG. 3 is an enlarged view showing a portion of the reamer of FIG. 1 in which a cutting insert or tip is mounted.

Referring to FIGS. 1–3, there is shown a reamer 10 which is constructed according to an embodiment of the present invention. The reamer 10 includes a generally cylindrical cutter body 12 and a generally cylindrical shank 14 which are in coaxial relationship with each other and which are fixed to each other so as to provide a single assembly. The cutter body 12 is made of a cemented carbide. The shank 14 has a diameter smaller than that of the cutter body 12, so that the reamer 10, as a whole, has a generally stepped cylindrical shape. This reamer 10 is held at the shank 14 by a suitable holder (not shown), and is attached through the holder to a main spindle which is rotatably mounted in the head of a drilling machine, a milling machine or other machine tool (not shown). The head is movable relative to a workpiece, by a feed mechanism of the machine tool, in an axial direction of the main spindle, so that the reamer 10 attached to the main spindle is movable relative to the workpiece. It is noted that the constructions of the holder and the head of the machine tool are publicly known, and accordingly descriptions thereof are not provided.

The cutter body 12, having an axial length smaller than that of the shank 14, has in its outer circumferential surface a first flute 20 formed to extend in parallel with an axis of the reamer 10 about which the reamer 10 is rotated. As shown in FIG. 2, the first flute 20 is defined by two faces 22, 28 which intersect with each other at substantially right angles. One of the two mutually intersecting faces 22, 28 (hereinafter referred to as the first upstream-side face 22) is located on the upstream side of the other (hereinafter referred to as the first downstream-side face 28) as viewed in the rotating direction of the reamer 10. The reamer 10 has an axially extending coolant hole 16 formed at its center and extending in the axial direction from the axially distal end of the shank 14 to an axially intermediate portion of the cutter body 12. The axially extending coolant hole 16 opens at one of its axial ends in the axial end face of the shank 14, and communicates at the other of its axial ends with a first radially extending coolant hole 24 which extends in the substantially radial direction. The first radially extending coolant hole 24 thus communicates at one of its axial open ends with the axially extending coolant hole 16, and opens at its first coolant supply spout 26, i.e., the other of its axial open ends in the first upstream-side face 22. Thus, a cutting fluid supplied from a cutting-fluid supplying device (not shown) flows through the axially extending coolant hole 16 and the radially extending coolant hole 24, and then spouts out of the first coolant supply spout 26. It is noted that the first radially extending coolant hole 24 is inclined with respect to a radius plane perpendicular to the axis of the reamer 10, by a predetermined angle, such that the first coolant supply spout 26 is axially nearer to the distal end face of the cutter body 12 than the above-described one of its axial open ends at which the first radially extending coolant hole 24 communicates with the axially extending coolant hole 16.

The first downstream-side face 28 has a recess or cutout 30 formed at a distal end corner portion thereof which is the radially remotest from the axis and which is the axially remotest from the shank 14. A cutting insert or tip 32 is fitted or inserted in the recess 30, and is fixedly brazed to the recess 30. The cutting insert 32 has a length slightly larger than that of the recess 30 in the axial direction of the cutter body 12, so as to have a portion projecting outwardly from the distal end face of the cutter body 12 over a short distance in the axial direction. The cutting insert 32 includes a diamond coating which is formed by sintering an artificial diamond at an ultra-high temperature and an ultra-high pressure, and a cemented carbide substrate which is covered by the diamond coating. The cutting insert 32 has a rake face 34 which is in the same surface as the first downstream-side face 28 of the first flute 20, and an axially-elongated first flank face 40 which circumferentially intersects with the rake face 34. The cutting insert 32 has a substantially polygonal shape, as shown in FIG. 3, so as to have a plurality of cutting edges. Described specifically, first and second major cutting edges 36, 38 are formed at the above-described projecting portion of the cutting insert 32, and an axially extending minor cutting edge 42 is formed by the intersection of the rake face 34 and the first flank face 40 so as to extend substantially in the axial direction of the cutter body 12. The first major cutting edge 36 is contiguous at one of its opposite ends to the minor cutting edge 42, and is contiguous at the other end to the second major cutting edge 38, so that the second major cutting edge 38 is nearer to the axis of the reamer 10 than the first major cutting edge 36. The first and second major cutting edges 36, 38 are both inclined with respect to the radius plane perpendicular to the axis of the reamer 10. The first major cutting edge 36 is inclined with respect to the radius plane by a comparatively large angle, while the second cutting edge 38 is inclined with respect to the plane by a comparatively small angle.

In the outer circumferential surface of the cutter body 12, a second flute 50 is formed to extend in the axial direction, as shown in FIG. 2. The second flute 50 is circumferentially contiguous to and positioned on the downstream side of the first flute 20. The second flute 50 has a radial depth generally smaller than that of the first flute 20, and is defined by the first flank face 40 and two faces 52, 60 which are circumferentially contiguous. The two faces 52, 60 which intersect with each other at substantially right angles. One of the two mutually intersecting faces 52, 60 (hereinafter referred to as the second upstream-side face 52) is located on the upstream side of the other (hereinafter referred to as the second downstream-side face 60) as viewed in the rotating direction of the reamer 10. The second upstream-side face 52 serves as a second flank face, and circumferentially extends from the first flank face 40 in a direction away from the rake face 34. The first flank face 40 is inclined with respect to a tangential plane tangent, at the axially extending minor cutting edge 42, to an imaginary cylindrical surface which is conceptually defined by the rotary trajectory of the axially extending minor cutting edge 42, so as to intersect with the tangential plane at a predetermined relief angle. The second flank face 52, circumferentially contiguous to the first flank face 40, is inclined with respect to the tangential plane by a clearance angle which is larger than the predetermined relief angle of the first flank face 40. The above-described second downstream-side face 60 intersects with the outer circumferential surface of the cutter body 12 at substantially right angles.

The above-described axially extending coolant hole 16 communicates at the above-described other of its axial ends with a second radially extending coolant hole 56, as well as with the above-described first radially extending coolant hole 24. The second radially extending coolant hole 56 extends in the substantially radial direction so as to communicate at one of its axial open ends with the axially extending coolant hole 16, and opens at its second coolant supply spout 58, i.e., at the other of its axial open ends in the second flank face 52. The second radially extending coolant hole 56 is inclined with respect to the radius plane perpendicular to the axis of cutter body 12, by the above-described predetermined angle as the first radially extending coolant hole 24, such that the second coolant supply spout 58 is axially nearer to the distal end face of the cutter body 12 than the above-described one of axial open ends at which the second radially extending coolant hole 56 communicates with the axially extending coolant hole 16. It is noted that the first and second radially extending coolant holes 24, 56 extend radially outwardly from the axial end of the axially extending coolant hole 16 in respective different radial directions, so as to open in the first upstream-side face 22 and the second flank face 52, respectively, through the respective coolant supply spouts 26, 58, which are circumferentially spaced apart from each other, as shown in FIG. 2. The second radially extending coolant hole 56 is inclined with respect to the first radially extending coolant hole 24 by an angle substantially equal to an angle of the inclination of the second flank face 52 with respect to the first upstream-side face 22. It is also noted that the second downstream-side face 60 serves as a scraper while the reamer 10 is in the cutting operation, as described below. In the present embodiment, each of the coolant holes 16, 24, 56 corresponds to a fluid passage, while each of the coolant supply spouts 26, 58 corresponds to a fluid supply spout.

The cutter body 12 includes a cutting blade portion 70 constituted by the rake face 34, the first and second major cutting edges 36, 38, the first flank face 40 and the minor cutting edge 42. The cutter body 12 further includes a guide portion 72 constituted by a portion having an outer circumferential surface in which either of the first flute 20 and the second flute 50 are not formed. The outer circumferential surface of the guide portion 72 circumferentially extends over at least 270° around the axis, and serves as a guide surface 74.

The cutting insert 32 projects slightly outwardly in the radial direction as well as in the axial direction. That is, the radial distance from the axis to the minor cutting edge 42 is larger than the radius of the guide portion 72 over the entire dimension of the minor cutting edge 42. In the reamer 10 constructed according to the present embodiment, the minor cutting edge 42 is slightly inclined with respect to the axis such that the radial distance from the axis to the minor cutting edge 42 is progressively reduced as the minor cutting edge 42 axially extends away from the axial distal end of the cutter body 12 toward the shank 14. Thus, the radial distance from the axis to the minor cutting edge 42 is the smallest at the longitudinally proximal or rear end of the minor cutting edge 42, which is remote from the major cutting edges 36, 38. The radial distance from the axis to the minor cutting edge 42 is larger even at the rear end of the minor cutting edge 42 than the radius of the guide portion 72, as shown in FIG. 3, by a predetermined distance δ which ranges from 3.5 μm to 5.5 μm. It is noted that the guide portion 72 is slightly back-tapered, namely, the radius of the guide portion 72 is also progressively reduced as the guide portion 72 axially extends away from the axial distal end of the cutter body 12 toward the shank 14. The radius of the guide portion 72 at the axial distal end is approximately 15mm. Accordingly, a ratio of the above-described predetermined distance δ (3.51 μm–5.5 μm) to the radius of the guide portion 72 ranges approximately from 0.00023 to 0.00037.

The cutter body 12 has a cutout 80 formed in the outer circumferential surface, such that the cutout 80 is positioned in the proximal end portion of the cutter body 12 which is axially contiguous to the shank 14, and diametrically opposed to the first and second flutes 20, 50. This cutout 80 serves to correct dynamic imbalance of the reamer 10 due to the presence of the first and second flutes 20, 50. In other words, the cutout 80 cooperates with the first and second flutes 20, 50 to maintain dynamic balance of the reamer 10, while the reamer 10 is rotated.

The reamer 10 constructed as described above is used to finish an inner circumferential surface of a hole prepared in a workpiece, for example, an inner circumferential surface of a valve guide of a cylinder head for a motor vehicle engine. The reamer 10 mounted in the main spindle of a machine tool is moved by the feed mechanism of the machine tool toward the prepared hole of the workpiece, while being rotated by the main spindle. The cutter body 12 of the reamer 10 is then introduced into the prepared hole. While the rotating cutter body 12 passes through the prepared hole, the inner circumferential surface of the prepared hole is cut by, principally, a portion of the first major cutting edge 36 which is contiguous to the axially extending minor cutting edge 42, and a portion of the axially extending minor cutting edge 42 which is contiguous to the first major cutting edge 36, with the cutter body 12 being suitably guided at the guide surface 74 by the inner circumferential surface of the prepared hole. Further, while the inner circumferential surface of the prepared hole is thus being cut, the cutting fluid supplied through the first and second coolant supply spouts 26, 58 serves to reduce a friction acting between the guide surface 74 of the cutter body 12 and the inner circumferential surface of the prepared hole, thereby to minimize a heat generated between the cutter body 12 and the workpiece. This method of finishing the inner circumferential surface of the prepared hole provides a finished hole having a high degree of roundness and a high degree of surface smoothness in its inner circumferential surface.

According to the reamer 10 of the present embodiment, in a case where some cutting chips are moved toward the down stream side of the minor cutting edge 42, i.e., into a spacing defined by the first and second flank faces 40, 52, the second downstream-side face 60 and the inner circumferential surface of the hole during the cutting operation, the cutting chips are advantageously prevented by the second downstream-side face 60 which serves as the scraper, from entering a radial gap between the guide surface 74 and the inner circumferential surface of the hole. Further, during the cutting operation, the cutting fluid is supplied into the second flute 50 through the second coolant supply spout 58, as well as into the first flute 20 through the first coolant supply spout 26, thereby washing away the chips from the second flute 50, so that the chips are further assuredly prevented from entering the radial gap between the guide surface 74 and the inner circumferential surface of the hole. The presence of the above-described scraper and the supply of the cutting fluid to the second flute 50 are effective to permit the finished hole to have a still higher degree of roundness and a still higher degree of surface smoothness in its inner circumferential surface.

FIG. 4 shows a result of test in which a conventional reamer having four blades equi-angularly spaced apart from each other and a single blade reamer of the present invention were used. In the test, eight intake valve guides (valve lifter holes) and eight exhaust valve guides (valve lifter holes) were finished by the conventional reamer, and another eight intake valve guides and another eight exhaust valve guides were finished by the reamer of the present invention. It is noted that all the valve guides were finished by the conventional reamer or the reamer of the invention under an identical cutting condition. FIG. 4(a) is a table showing a roundness of each valve guide which was finished by the conventional reamer, while FIG. 4(b) is a table showing a roundness of each valve guide which was finished by the reamer of the invention. As shown in FIG. 4(a), all the valve guides finished by the conventional reamer did not satisfy a requirement of their roundness. Namely, most of the valve guides finished by the conventional reamer exhibited their respective roundness values which were outside the tolerance of 7 μm. On the other hand, as shown in FIG. 4(b), all the valve guides finished by the reamer of the invention satisfied the requirement of roundness of 7 μmor less. The valve guides finished by the reamer of the invention exhibited their values which were much smaller than 7 μm. Thus, this test revealed that the reamer of the invention is capable of finishing a hole with a higher degree of roundness than the conventional reamer.

FIG. 5 shows a result of another test in which valve guides were finished by three reamers A, B, C of the present invention under the same cutting condition as in the above-described test. The three reamers A, B, C were different from each other in radius difference between the radial distance from the axis to the axially extending cutting edge and the radial distance from the axis to the guide surface. The reamer A had a radius difference of 5 μm. The reamer B had a radius difference of 10 μm. The reamer C had a radius difference of 15 μm. In the test, three sets each consisting of eight intake valve guides and eight exhaust valve guides were finished by the reamers A, B, C, respectively, and then another three sets each consisting of eight intake valve guides and eight exhaust valve guides were finished by the reamers A, B, C, respectively. That is, 96 valve guides in total were finished by the reamers A, B and C. Out of the eight finished intake valve guides, four of the valve guides (the first, third, fifth and seventh valve guides) were chosen to measure their roundness and surface roughness values. Out of the eight finished exhaust valve guides, four of the valve guides (the second, fourth, sixth and eighth valve guided) were chosen to measure their roundness and surface roughness values. As is clear from FIG. 5, for obtaining a higher degree of roundness and a higher degree of surface smoothness, it is preferable that the radius difference be 10 μm or less. Further, the test revealed that the highest degree of roundness and the highest degree of surface smoothness were obtained where the reamer A, having the radius difference of 5 μm as the reamer of the above-described embodiment, was used.

While the embodiment of the present invention has been described above for illustrative purpose only, it is to be understood that the present invention is not limited to the details of the above-described embodiment but may be embodied with various changes, modifications and improvements.

For example, the cutting insert 32 is fixedly brazed to the recess 30 of the cutter body 12 in the above-illustrated embodiment. However, the cutting insert 32 may be a throwaway cutting insert or tip which is interchangeably attached to the recess 30 by a screw or other attaching member. Further, the cutting insert 32 may be slidably attached to the recess 30 such that the projection of the cutting insert 32 beyond the periphery of the cutter body 12 is adjustable by an adjusting screw or other adjusting member.

It is to be understood that the present invention may be embodied with various other changes, modifications and improvements, which may occur to those skilled in the art, without departing from the spirit and scope of the present invention defined in the following claims:

What is claimed is:

1. A reamer comprising;
a generally cylindrical cutter body having (a) a flute formed in an outer circumferential surface of said cutter body and extending from an axially distal end of said cutter body toward an axially proximal end of said cutter body, (b) a cutting blade portion positioned at a longitudinally distal end of a downstream one of widthwise opposite edges of said flute as viewed in a rotating direction of said reamer, and (c) a guide portion having a guide surface which is circumferentially adjacent to said flute and which circumferentially extends over at least 240° about an axis of said cutter body, said guide surface being a part of said outer circumferential surface of said cutter body.

2. A reamer according to claim 1, wherein a radial distance from said axis to said guide surface is constant over a circumferential length of said guide surface.

3. A reamer according to claim 1, wherein at least a portion of said generally cylindrical cutter body which is other than said cutting blade portion is made of the same material.

4. A reamer according to claim 3, wherein said same material is a cemented carbide.

5. A reamer according to claim 1, wherein said cutting blade portion is coated with a ultra-high temperature and ultra-high pressure sintered compact.

6. A reamer according to claim 1, wherein said generally cylindrical cutter body further has a fluid passage formed therethrough, and a fluid supply spout communicating with said fluid passage and open in a flank face which is circumferentially contiguous to and positioned on a downstream side of said flute as viewed in said rotating direction, so that a fluid flowing through said fluid passage is delivered through said fluid supply spout to said flank face.

7. A reamer according to claim 1, wherein said generally cylindrical cutter body has a second flute in addition to said flute as a first flute, said second flute being formed in said outer circumferential surface, extending from said axially distal end of said cutter body toward said axially proximal end of said cutter body, and circumferentially contiguous to and positioned on a downstream side of said first flute as viewed in said rotating direction, such that a lateral surface defined by widthwise opposite edges of said second flute is generally concaved toward said axis as viewed in a transverse cross section of said cutter body, and wherein a portion of said lateral surface which is circumferentially remotest from said first flute intersects with said outer circumferential surface of said cutter body at substantially right angles.

8. A reamer according to claim 1, wherein said generally cylindrical cutter body has a second flute in addition to said flute as a first flute, said second flute being formed in said outer circumferential surface, extending from said axially distal end of said cutter body toward said axially proximal end of said cutter body, and circumferentially contiguous to and positioned on a downstream side of said first flute as viewed in said rotating direction, such that a lateral surface defined by widthwise opposite edges of said second flute is generally concaved toward said axis as viewed in a transverse cross section of said cutter body, and wherein said cutting blade portion has an axially extending cutting edge at a radially outer end thereof, said lateral surface having at least two flat faces which are circumferentially contiguous to each other, one of said at least two flat faces being circumferentially contiguous to said first flute and serving as a flank face of said axially extending cutting edge, one of said at least two flat faces being circumferentially remotest from said first flute and intersecting with said outer circumferential surface of said cutter body at substantially right angles.

9. A reamer according to claim 7, wherein said generally cylindrical cutter body further has a fluid passage formed therethrough and a fluid supply spout communicating with said fluid passage and open in said lateral surface, so that a fluid flowing through said fluid passage is delivered through said fluid supply spout into said second flute.

10. A reamer according to claim 1, wherein said cutting blade portion projects outwardly from said outer circumferential surface in a radial direction of said generally cylindrical cutter body, so that a radial distance from said axis to a radially outer end of said cutting blade portion is larger than a radial distance from said axis to said guide surface, by a predetermined amount ranging from 3 $\mu$m to 20 $\mu$m.

11. A reamer according to claim 1, wherein said generally cylindrical cutter body further has a cutout formed in said outer circumferential surface, such that said cutout is axially offset from said cutting blade portion toward said axially proximal end of said cutter body, and such that said cutout is substantially diametrically opposed to said flute, so that said cutout cooperates with said flute to maintain a dynamic balance of said reamer while said reamer is rotated.

12. A reamer according to claim 1, wherein said generally cylindrical cutter body is slightly tapered such that a radial distance from said axis to said guide surface is progressively reduced in a direction away from said axially distal end of said cutter body toward said axially proximal end of said cutter body.

13. A reamer according to claim 1, wherein a radial distance from said axis to a radially outer end of said cutting blade portion is progressively reduced in a direction away from said axially distal end of said cutter body toward said axially proximal end of said cutter body.

14. A reamer according to claim 1, wherein said cutting blade portion is constituted by a cutting insert which is formed independently of the other portion of said generally cylindrical cutter body and which is fixed to said other portion of said cutter body, said cutting insert including a ultra-high temperature and ultra-high pressure sintered compact and a cemented carbide substrate which is coated with said sintered compact.

15. A reamer according to claim 1, further comprising a generally cylindrical shank having a diameter smaller than that of said generally cylindrical cutter body, wherein said cutter body and said shank are fixed to each other so as to provide a single assembly.

16. A method of finishing an inner circumferential surface of a hole prepared in a workpiece, by using the reamer recited in claim 1, said method comprising:

a step of moving said reamer and said workpiece relative to each other in an axial direction of said reamer while rotating said reamer and said workpiece relative to each other, so that said inner circumferential surface is cut by said cutting blade portion, with said generally cylindrical cutter body being guided by said inner circumferential surface of said hole, at said guide surface which circumferentially extends over at least 240° about said axis.

17. A method according to claim 16, wherein said generally cylindrical cutter body further has a fluid passage formed therethrough, and a fluid supply spout communicating with said fluid passage and open in a flank face which is circumferentially contiguous to and positioned on a downstream side of said flute as viewed in said rotating direction, said method further comprising:

a step of supplying a fluid to said fluid passage so that said fluid is delivered through said fluid supply spout to said flank face, whereby cutting chips moved toward said downstream side are prevented from entering a radial gap between said guide surface and said inner circumferential surface of said hole.

* * * * *